Aug. 12, 1924.
T. K. AGAR
1,504,594
ICE HARVESTER
Filed Aug. 31, 1921    2 Sheets-Sheet 1
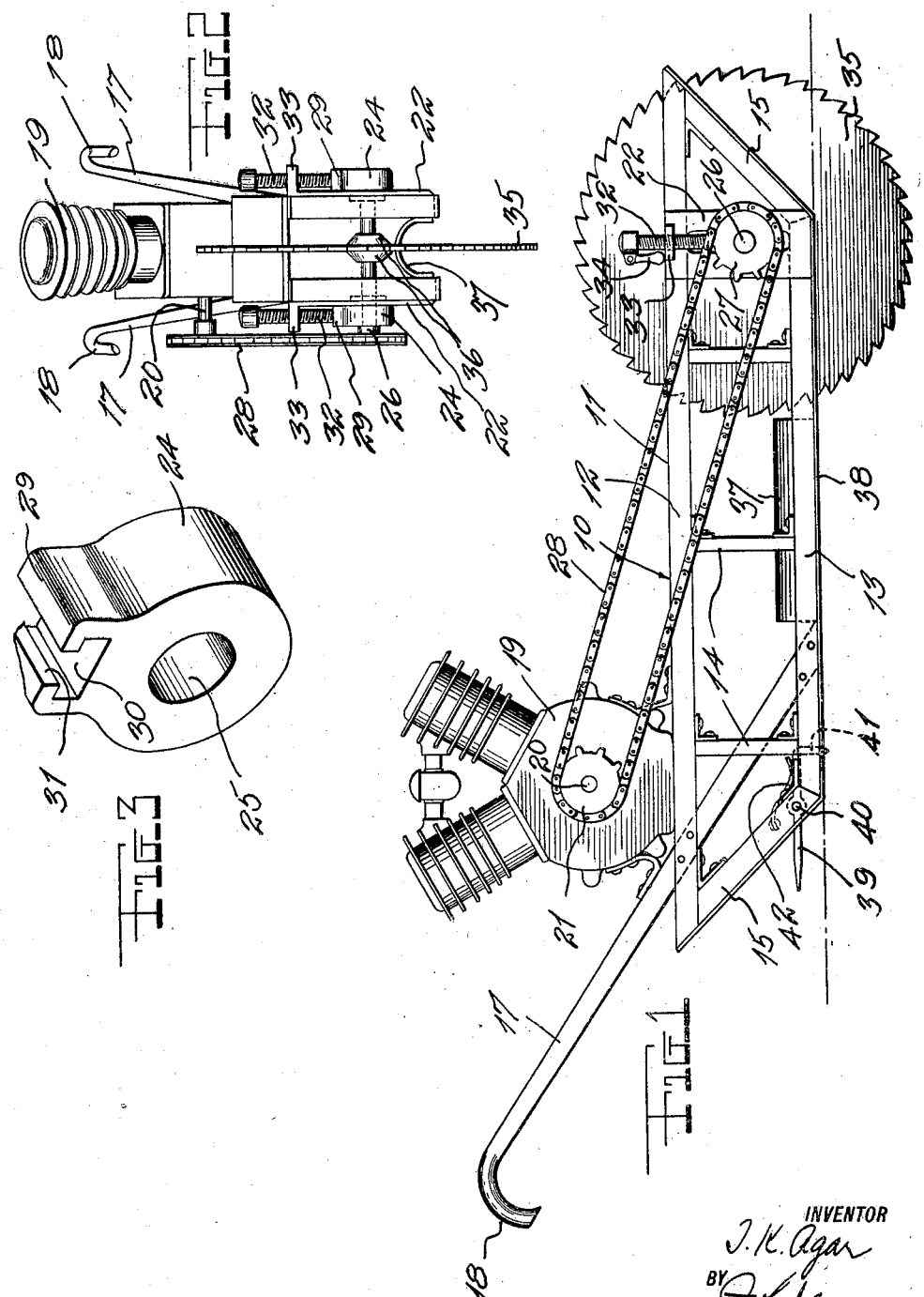
INVENTOR
T. K. Agar
BY
ATTORNEY Aug. 12, 1924.
T. K. AGAR
1,504,594
ICE HARVESTER
Filed Aug. 31, 1921    2 Sheets-Sheet 2
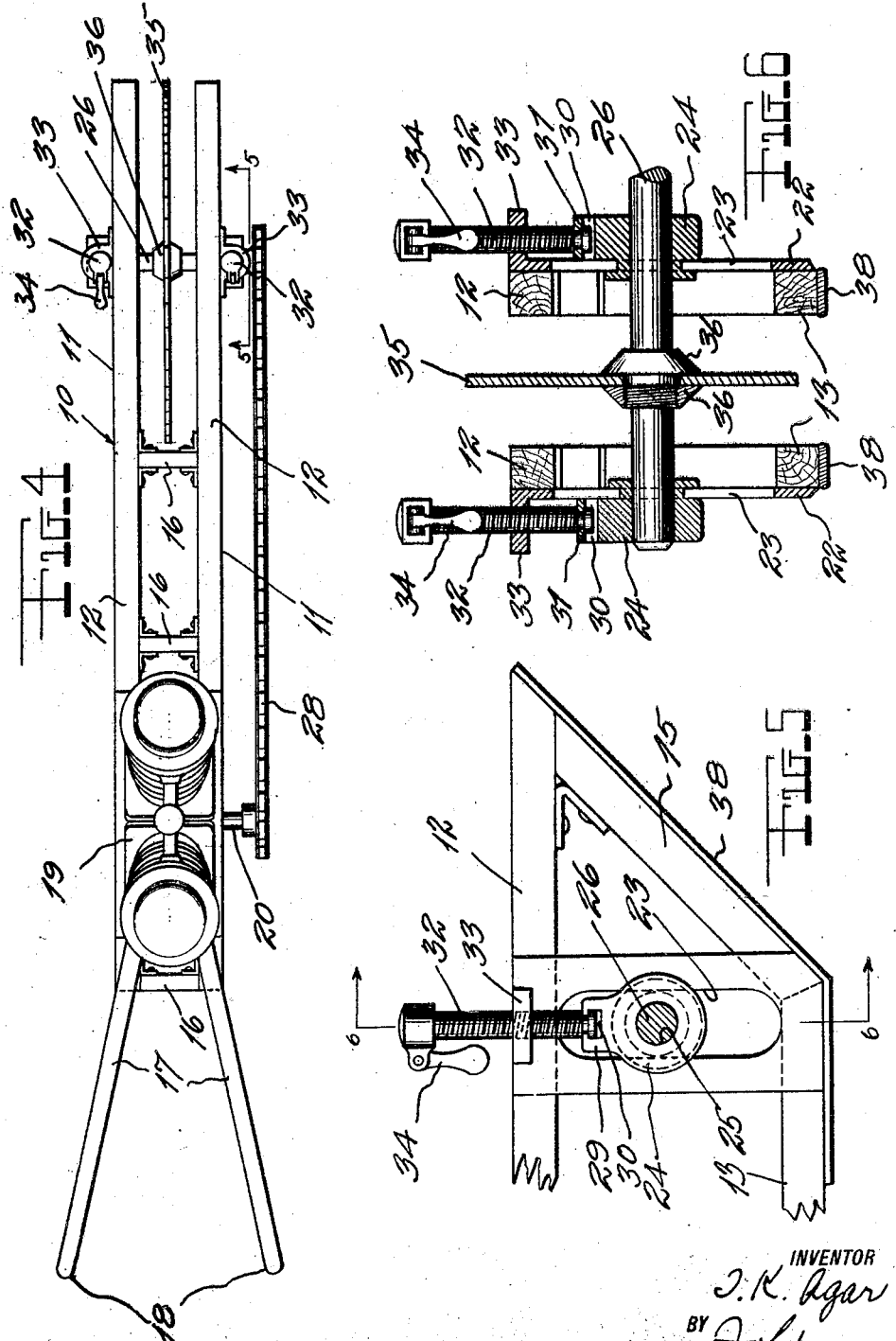
INVENTOR
T. K. Agar
BY
ATTORNEY Patented Aug. 12, 1924.

1,504,594

UNITED STATES PATENT OFFICE.

THOMAS K. AGAR, OF SHEFFIELD, MASSACHUSETTS.

ICE HARVESTER.

Application filed August 31, 1921. Serial No. 497,228.

*To all whom it may concern:*

Be it known that I, THOMAS K. AGAR, a citizen of the United States, residing at Sheffield, in the county of Berkshire and State of Massachusetts, have invented certain new and useful Improvements in Ice Harvesters, of which the following is a specification.

This invention relates to improvements in ice harvesters and has for its principal object to provide a device for cutting ice fields into convenient blocks which may be readily handled and stored for future use.

Another object of the invention is in the provision of a vertically adjustable cutting saw which may be elevated or lowered so as to make cuts varying in depth, to suit different requirements.

A further object of the invention is to provide an adjustable guide member for holding the saw and its associated mechanism in proper alinement so as to overcome the possibility of the saw binding against the walls of the cut.

Still another object of the invention is to provide a shield arranged to prevent the cuttings or saw dust from being thrown into the face of the operator.

With these and other objects in view the invention consists in the novel construction, combination and arrangements of parts which will be set forth in the following specification, and illustrated in the accompanying drawing, in which, Figure 1, is a side view in elevation of this improved ice harvester, Figure 2, is an end view of the device, Figure 3, is a perspective view of one of the saw spindle bearing members, Figure 4, is a top plan view of the device, Figure 5, is a fragmentary side view of the forward portion of the device, showing the saw spindle in section, Figure 6, is a vertical sectional view through the device taken on line 6—6 of Figure 5.

Referring to the drawing in detail the numeral 10, designates in its entirety the frame of the device which comprises a pair of runners 11, each of which consists of a pair of horizontally disposed bars 12 and 13, respectively relatively long and short as will be shown in the drawings. These bars are held in spaced parallel relation by the vertically disposed bars 14 and connecting the ends of the bars 12 and 13 are angularly extending bars 15. The runners are connected together and held in spaced parallel relation by transversely extending bars 16 as shown in Figure 4. Extending upwardly and rearwardly from the rear end of the frame 10, is a pair of divergent handle members 17 provided at their extreme rear ends with grips 18.

Secured to the rear end of the frame 10, in vertical alinement with the rear end of the lower bars 13, is a motor 19 provided with a drive shaft 20, and to one end is secured a sprocket wheel 21, the use of which will be more fully hereinafter described.

Secured to the outer sides of the runners, near their forward ends, are plates 22 formed with vertically extending guide slots 23 and slidably mounted in said guide slots are bearings 24 pierced with openings 25 for the reception of the saw shaft 26, to one end of which is secured a sprocket 27. A chain 28 runs over the sprockets 21 and 27 and it will thus be seen that when the motor 19 is set in operation the saw shaft and associated mechanism will be driven. In order that the saw shaft may be elevated or lowered, the upper side of each bearing is formed with a lug 29, having a transversely extending groove 30 provided at its edges with inwardly projecting tongues 31 for swivelly connecting the adjusting screws 32 to the bearing members. The screws 32 are threaded through outwardly extending ears 33 formed at the upper ends of the plates 22 and suitable handles 34 are provided by means of which the screws may be rotated. As illustrated in Figure 6, the saw 35 is secured to the shaft or arbor 26 between a pair of internally screw threaded collars 36.

In order to prevent the cuttings or saw dust from being thrown upwardly and upon the operator an arched shield 37 is secured to the lower bars 13 of the runner frames, immediately in the rear of the saw and bridges the space between the bars as will be clearly seen in Figure 2. Each runner may be provided with a metal strap 38 which covers its under side and provides a smooth surface for engagement with the ice over which the device travels.

The guiding means is best illustrated in Figure 1, and comprises a plate 39 which is pivoted between the lower bars 13 of the runners as at 40. The forward end of this plate is provided with a reduced, downturned tongue 41 adapted to enter the cut made by the saw, when the device is in operation, to prevent the frame from swinging laterally and the saw from binding against the walls of the cut. In order to retain the tongue in operative position and yet permit the same to be elevated, a spring 42 is arranged to bear thereon.

In operation it will be seen that as the motor is set into operation the user grasps the grips 18 of the handles 17 and moving forwardly it will be obvious that the saw will cut a groove in the surface traversed. Owing to the engagement of the side edges of the guide tongue 41 with the sides of the groove, it will be seen that the device will be held in a straight course and danger of the saw binding against the sides of the groove will be eliminated. It is obvious that the depth of the cut may be regulated by adjusting the saw vertically and thus light or deep cuts may be made, according to the desires of the user.

While in the foregoing there has been shown and described the preferred embodiment of this invention it is to be understood that certain minor changes in the details of construction, combination, and arrangement of parts may be resorted to without departing from the spirit and scope of the invention as claimed.

What is claimed is:—

An ice harvester comprising a pair of spaced-apart beams, runners on the supporting edge of said beams, propelling and guiding handles secured to the beams and runners, a motor mounted between said beams at the rear thereof, a guide plate mounted vertically on each beam at the forward end, vertical guide slots in said plates, ears integral with said plates above the guide slots, pillow blocks slidably mounted in said guide slots, said pillow blocks having grooves at their upper ends, inwardly projecting tongues above said grooves, adjusting screws mounted in said ears, the lower ends of said screws registering in the grooves of said pillow blocks, pivoted handles at the upper ends of said screws adapted to rotate said screws, a shaft journalled in said pillow blocks, a saw fixed on said shaft, means for driving said shaft from said motor, and a spring actuated pivoted tracking finger aligned with said saw and at the rear of the harvester.

In witness whereof I affix my signature.

THOMAS K. AGAR.